US011470606B2

(12) United States Patent
Damnjanovic et al.

(10) Patent No.: US 11,470,606 B2
(45) Date of Patent: Oct. 11, 2022

(54) DECODING OF SEMI-PERSISTENT SCHEDULING OCCASIONS

(71) Applicant: QUALCOMM Incorporated, San Diego, CA (US)

(72) Inventors: Aleksandar Damnjanovic, Del Mar, CA (US); Seyed Ali Akbar Fakoorian, San Diego, CA (US); Andrei Dragos Radulescu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 16/947,429

(22) Filed: Jul. 31, 2020

(65) Prior Publication Data

US 2021/0068106 A1   Mar. 4, 2021

Related U.S. Application Data

(60) Provisional application No. 62/893,428, filed on Aug. 29, 2019.

(51) Int. Cl.
*H04W 72/04* (2009.01)
*H04L 1/18* (2006.01)

(52) U.S. Cl.
CPC ....... *H04W 72/0446* (2013.01); *H04L 1/1812* (2013.01); *H04W 72/0413* (2013.01)

(58) Field of Classification Search
CPC .......... H04W 72/0446; H04W 72/0413; H04L 1/1812
See application file for complete search history.

(56) References Cited

U.S. PATENT DOCUMENTS

| | | | |
|---|---|---|---|
| 2011/0047430 A1* | 2/2011 | Feuersanger | ......... H04L 1/1822 714/E11.131 |
| 2014/0161069 A1* | 6/2014 | Ohta | ...................... H04W 76/00 370/329 |
| 2014/0206375 A1* | 7/2014 | Ohta | ................. H04W 72/0406 455/452.2 |
| 2020/0177318 A1* | 6/2020 | Belleschi | .......... H04W 72/0493 |

OTHER PUBLICATIONS

International Search Report and Written Opinion—PCT/US2020/044737—ISA/EPO—dated Oct. 6, 2020.

(Continued)

*Primary Examiner* — Brenda H Pham
(74) *Attorney, Agent, or Firm* — Harrity & Harrity, LLP

(57) ABSTRACT

Various aspects of the present disclosure generally relate to wireless communication. In some aspects, a user equipment (UE) may identify a plurality of semi-persistent scheduling (SPS) configurations corresponding to a plurality of SPS occasions for reception of a physical downlink shared channel (PDSCH) in a slot; decode a first SPS occasion, of the plurality of SPS occasions, to attempt to receive the PDSCH in the slot; and selectively decode a second SPS occasion, of the plurality of SPS occasions, to attempt to receive the PDSCH in the slot. Numerous other aspects are provided.

30 Claims, 9 Drawing Sheets

(56) References Cited

OTHER PUBLICATIONS

Vivo: "Discussion on the Periodicity Misalignment between TSC Traffic and SPS/CG", 3GPP Draft; R2-1910006, Discussion on Periodicity Misalignment between TSC Traffic and SPSCG, 3rd Generation Partnership Project (3GPP), Mobile Competence Centre; 650, Route Des Lucioles; F-06921 SOP, vol. RAN WG2. No. Prague, Czech Republic; Aug. 26, 2019-Aug. 30, 2019, Aug. 16, 2019 (Aug. 16, 2019), XP051767792, 3 pages, Retrieved from the Internet: URL: http://www.3gpp.org/ftp/tsg_ran/WG2_RL2/TSGR2_107/Docs/R2-1910006.zip [retrieved on Aug. 16, 2019].

ZTE et al: "Discussion on PDSCH Repetition for LTE URLLC", 3GPP Draft; R1-1803962, Discussion on PDSCH Repetition for LTE URLLC, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426251, 4 pages, Retrieved from the Internet: URL: http://www.3gpp.org/ftp/Meetings%5F3GPP%5FSYNC/RAN1/Docs/ [retrieved on Apr. 15, 2018].

\* cited by examiner

DECODING OF SEMI-PERSISTENT SCHEDULING OCCASIONS

CROSS-REFERENCE TO RELATED APPLICATION

This patent application claims priority to U.S. Provisional Patent Application No. 62/893,428, filed on Aug. 29, 2019, entitled "DECODING OF SEMI-PERSISTENT SCHEDULING OCCASIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for decoding of semi-persistent scheduling occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a plurality of semi-persistent scheduling (SPS) configurations corresponding to a plurality of SPS occasions for reception of a physical downlink shared channel (PDSCH) in a slot; decoding a first SPS occasion, of the plurality of SPS occasions, to attempt to receive the PDSCH in the slot; and selectively decoding a second SPS occasion, of the plurality of SPS occasions, to attempt to receive the PDSCH in the slot.

In some aspects, a UE for wireless communication may include memory and one or more processors operatively coupled to the memory. The memory and the one or more processors may be configured to identify a plurality of SPS configurations corresponding to a plurality of SPS occasions for reception of a PDSCH in a slot; decode a first SPS occasion, of the plurality of SPS occasions, to attempt to receive the PDSCH in the slot; and selectively decode a second SPS occasion, of the plurality of SPS occasions, to attempt to receive the PDSCH in the slot.

In some aspects, a non-transitory computer-readable medium may store one or more instructions for wireless communication. The one or more instructions, when executed by one or more processors of a UE, may cause the one or more processors to: identify a plurality of SPS configurations corresponding to a plurality of SPS occasions for reception of a PDSCH in a slot; decode a first SPS occasion, of the plurality of SPS occasions, to attempt to receive the PDSCH in the slot; and selectively decode a second SPS occasion, of the plurality of SPS occasions, to attempt to receive the PDSCH in the slot.

In some aspects, an apparatus for wireless communication may include means for identifying a plurality of SPS configurations corresponding to a plurality of SPS occasions for reception of a PDSCH in a slot; means for decoding a first SPS occasion, of the plurality of SPS occasions, to attempt to receive the PDSCH in the slot; and means for selectively decoding a second SPS occasion, of the plurality of SPS occasions, to attempt to receive the PDSCH in the slot.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
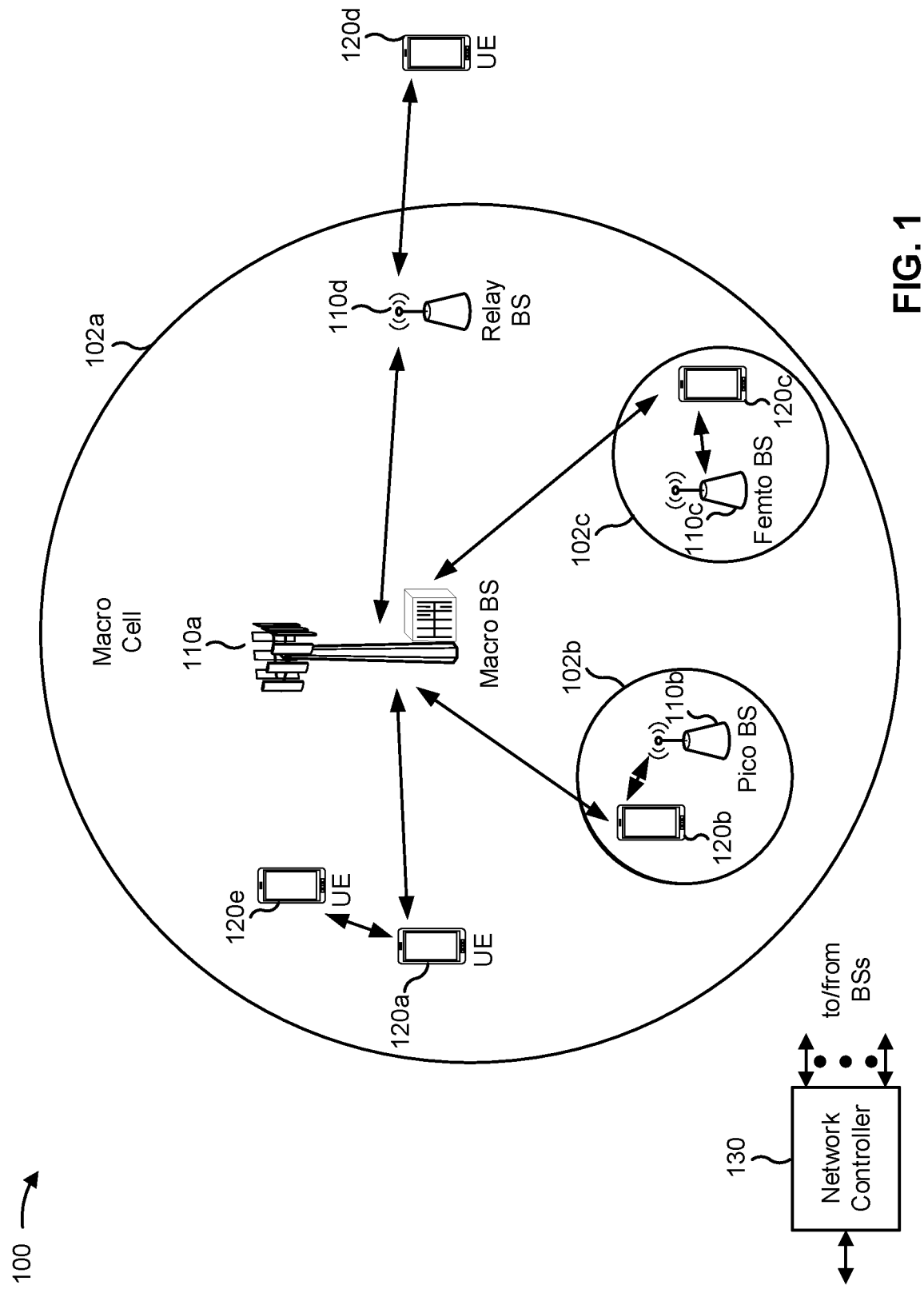
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
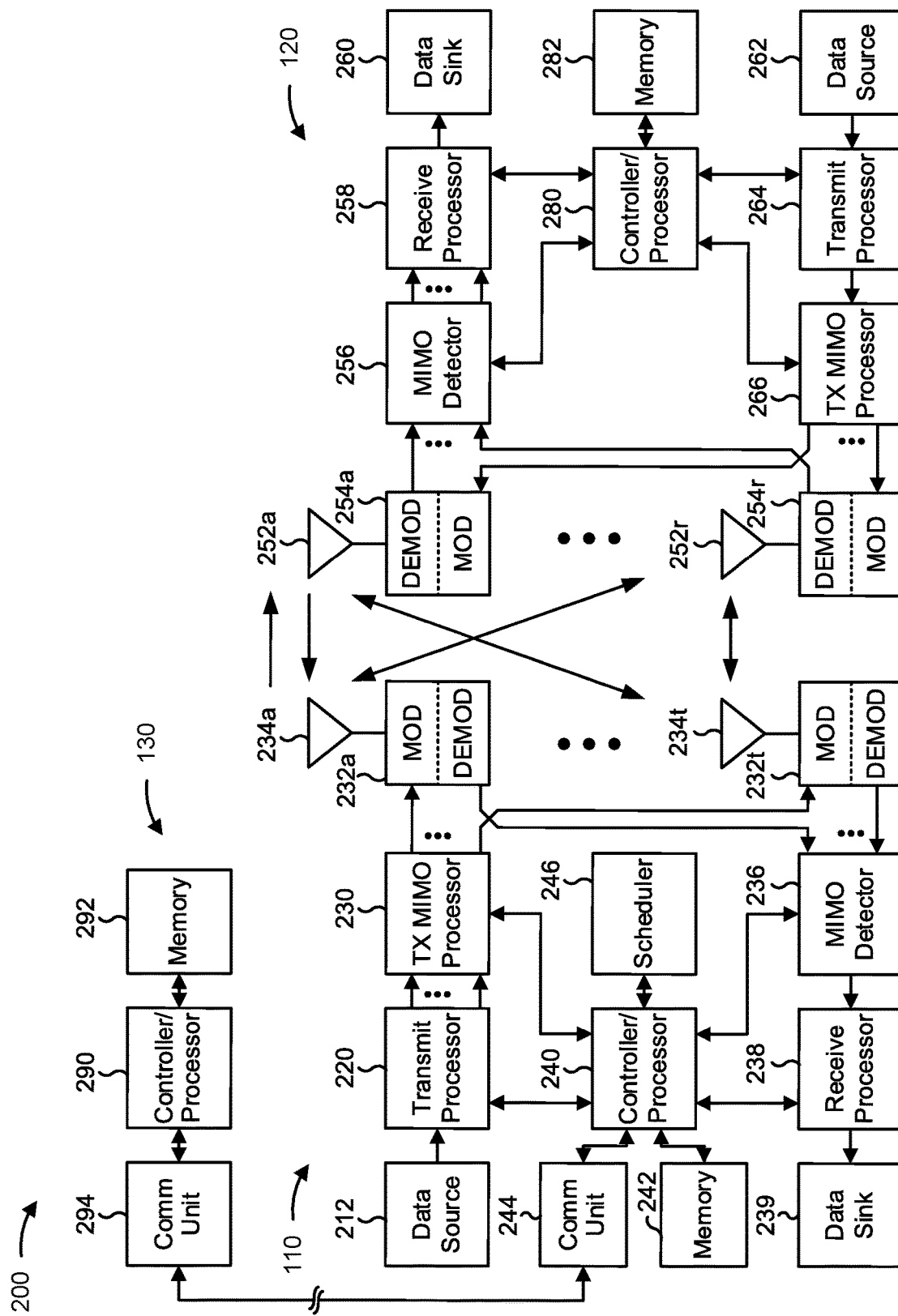
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with decoding of semi-persistent scheduling (SPS) occasions, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for identifying a plurality of SPS configurations corresponding to a plurality of SPS occasions for reception of a PDSCH in a slot, means for decoding a first SPS occasion, of the plurality of SPS occasions, to attempt to receive the PDSCH in the slot, means for selectively decoding a second SPS occasion, of the plurality of SPS occasions, to attempt to receive the PDSCH in the slot, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
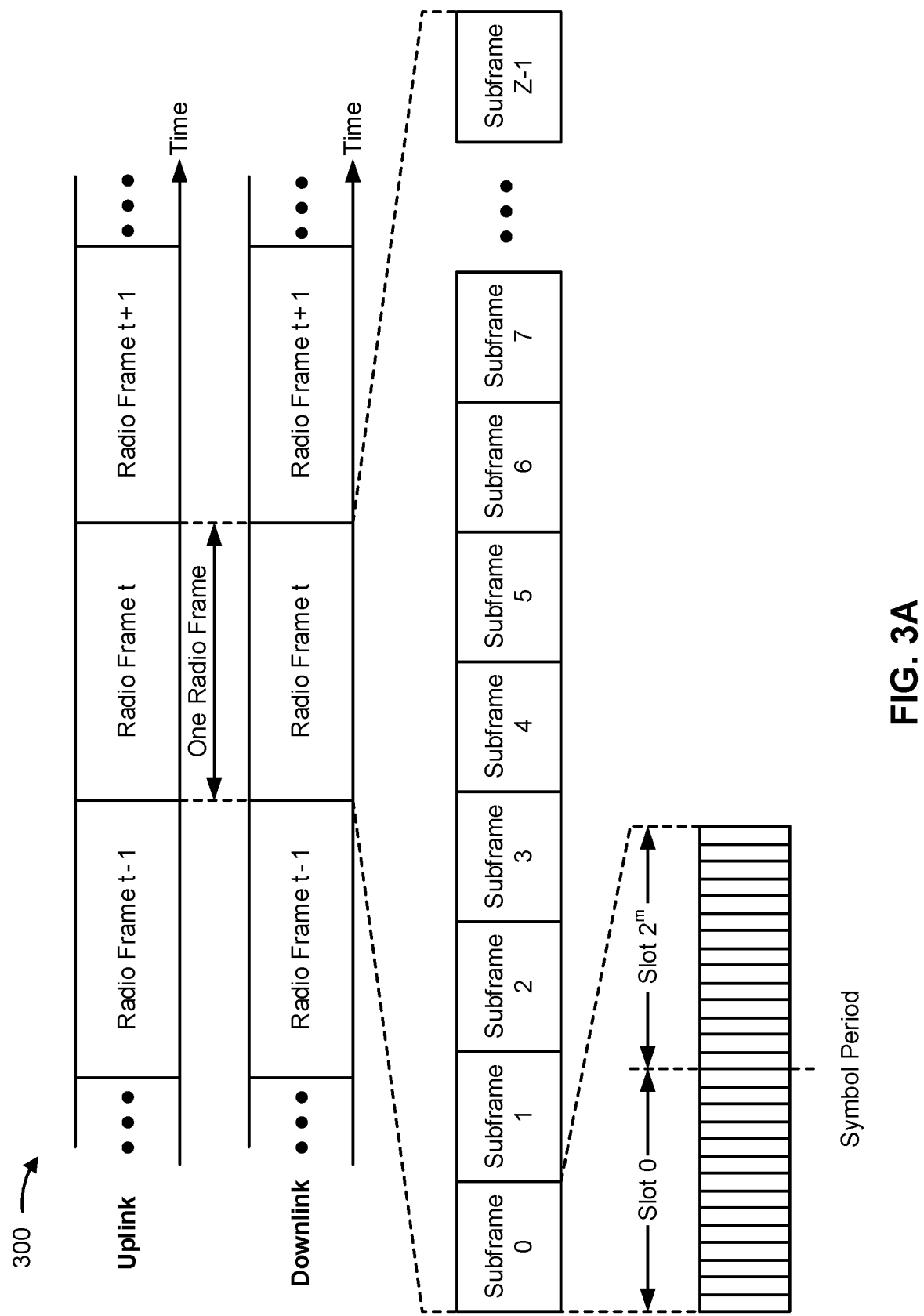
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
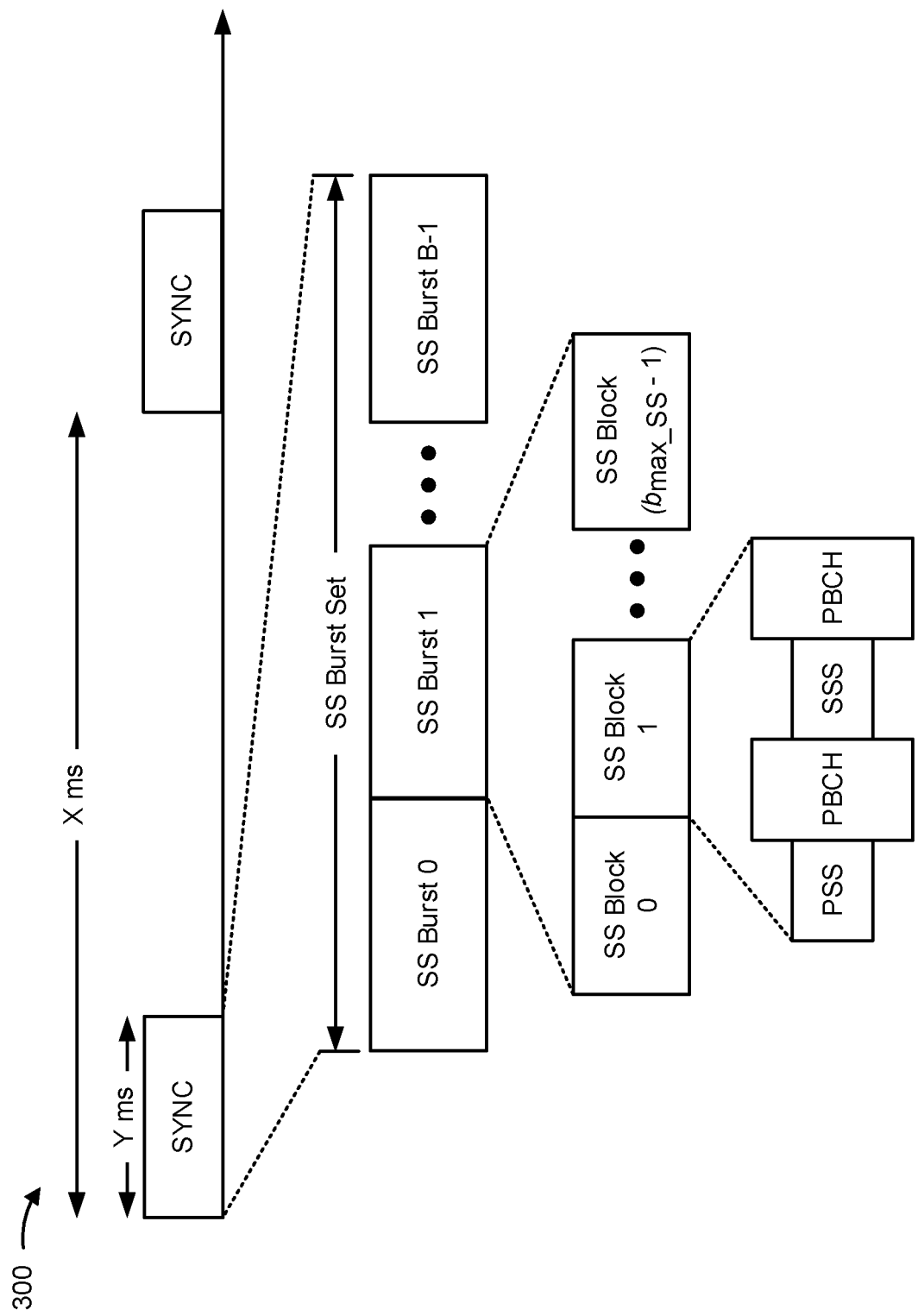
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_ss}-1$), where $b_{max\_ss}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
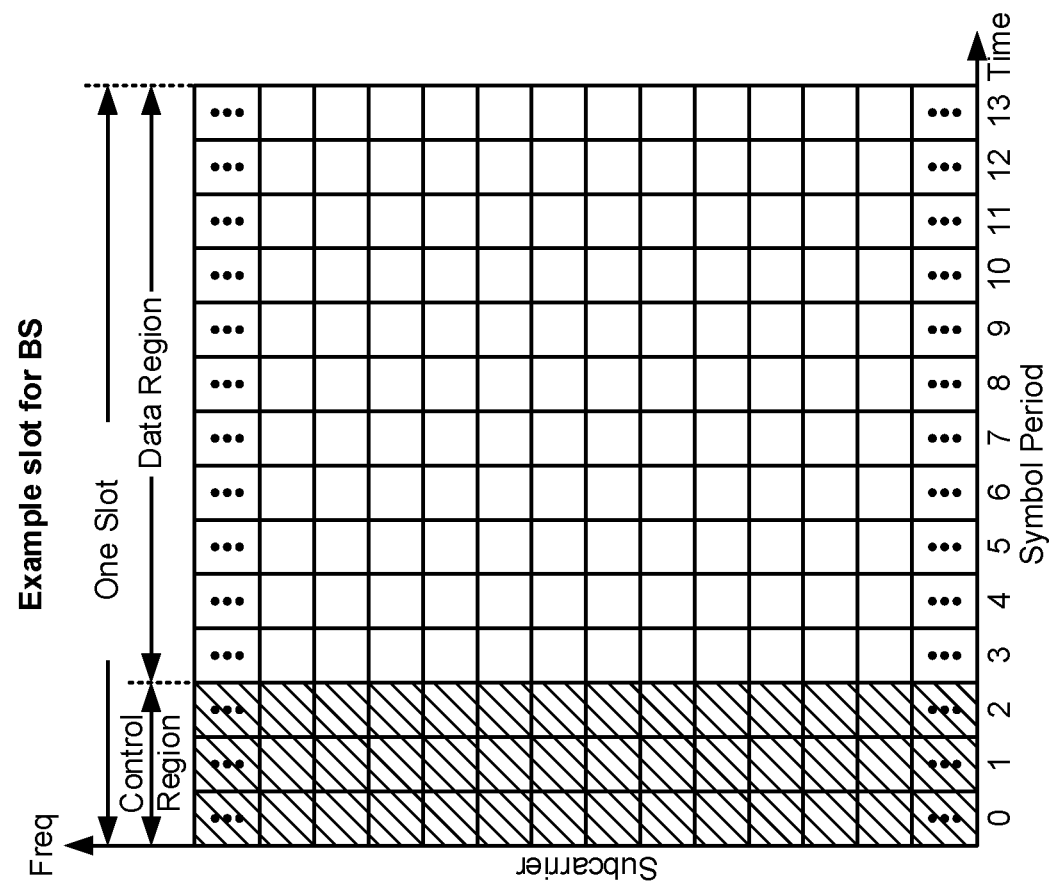
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
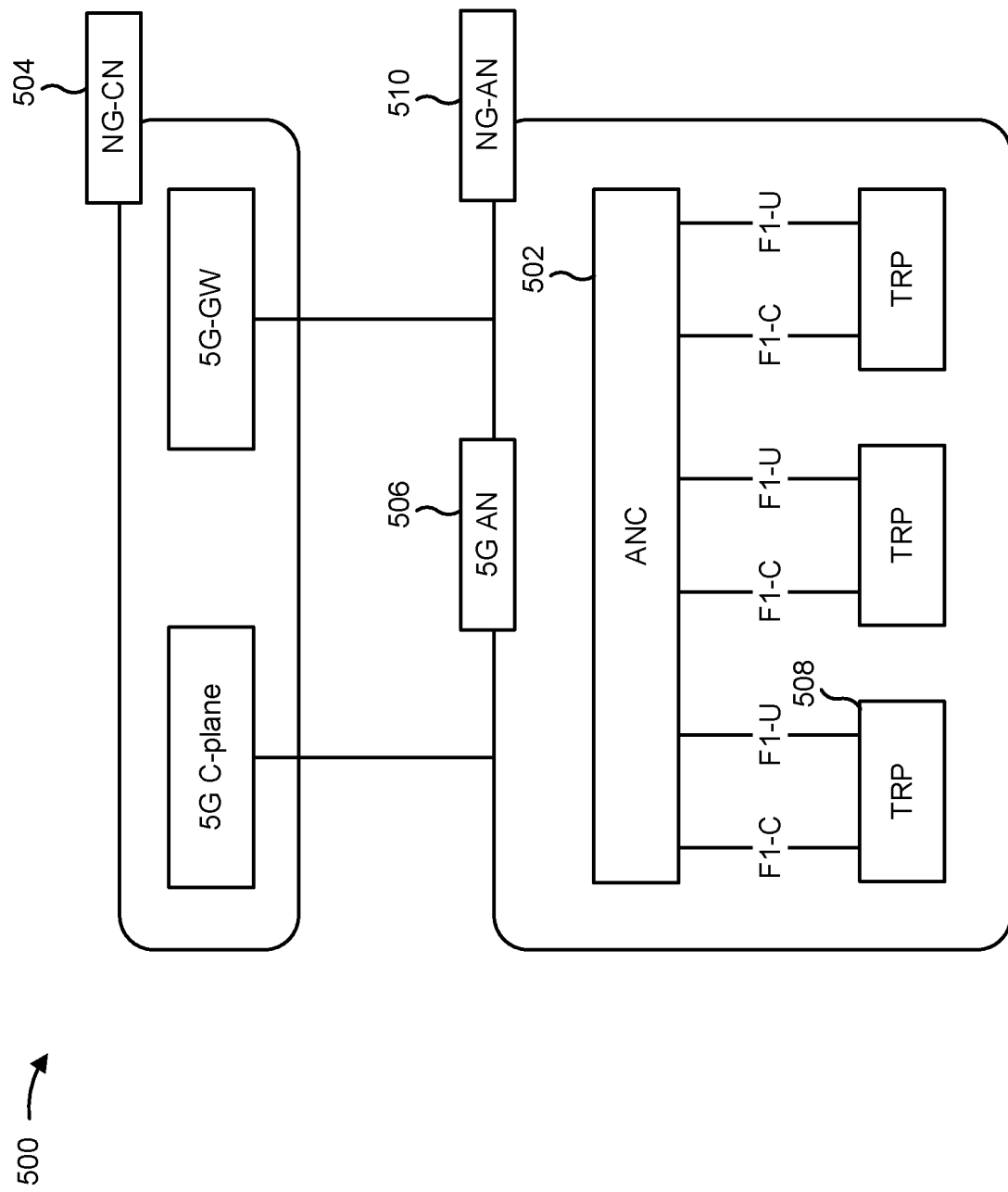
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
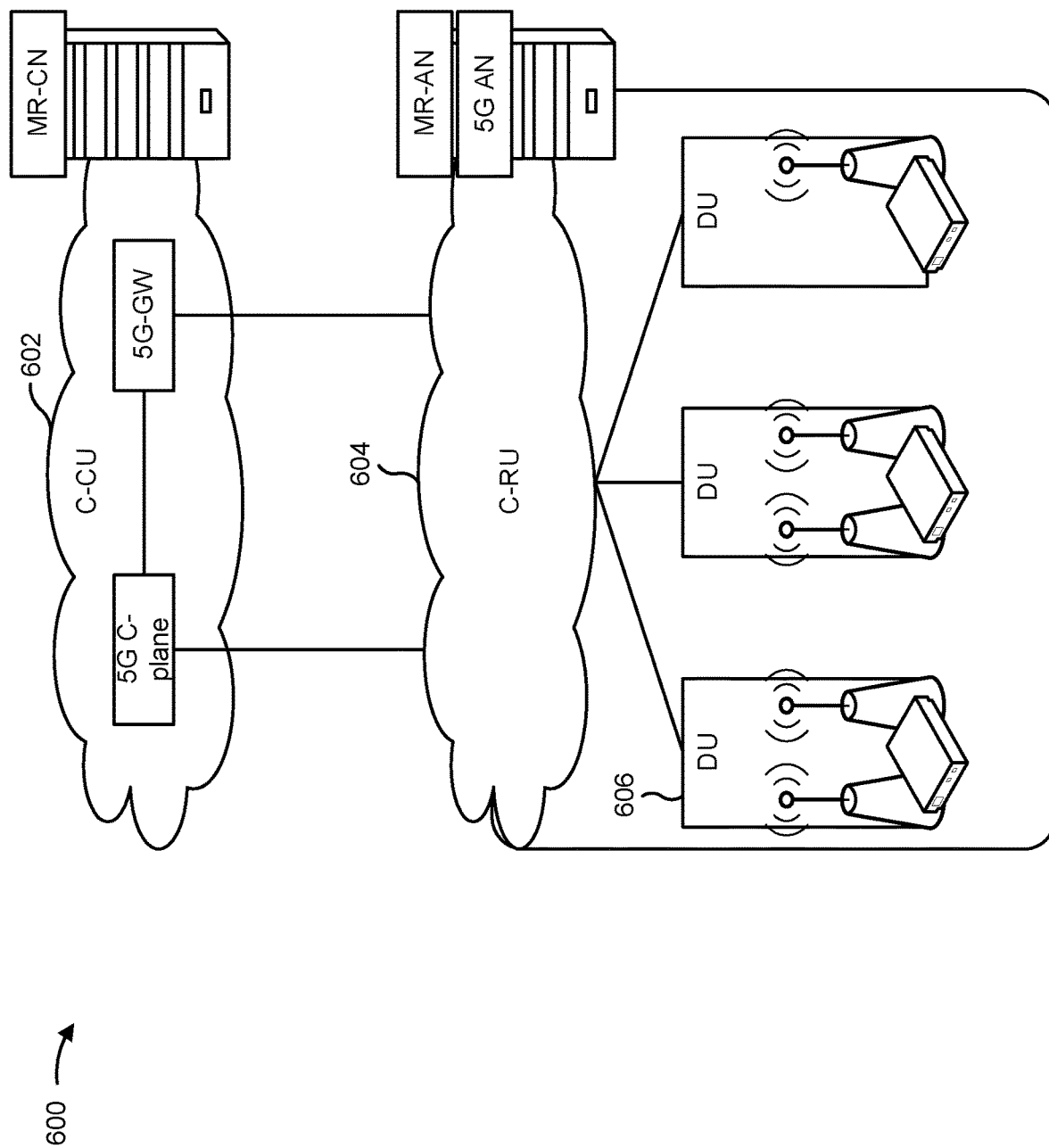
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as in ultra-reliable low-latency communication (URLLC) systems, a BS may provide greater than a threshold level of reliability and less than a threshold level of latency for UEs. For example, a BS may ensure high reliability and low latency for Industrial Internet of Things (IIoT) UEs, V2X UEs, MTC UEs, and/or the like. The BS may communicate with UEs using uplink grant free communication and downlink semi-persistent scheduling (SPS) communication to satisfy the threshold level of reliability and the threshold level of latency. For example, by using grant free communication for uplink transmissions and SPS communication for downlink transmissions, the BS may reduce a need for physical downlink control channel (PDCCH) transmissions, which may reduce a likelihood of errors in URLLC communications.

When using SPS communication for downlink transmissions, the BS may schedule relatively large quantities of UEs for a same slot or sub-slot on different SPS configurations. When the BS is to update SPS parameters of one or more UEs using a PDCCH transmission, the BS may provide SPS reactivations to the UEs scheduled in the same slot or sub-slot. As a result, an amount of PDCCH overhead associated with the SPS reactivations for large quantities of UEs may be excessive, which may reduce network performance.

Some techniques may use group scheduling to reduce PDCCH overhead. For example, a BS may group UEs into a set of UE groups and may signal the UE groups using corresponding group-common downlink control information (GC-DCIs). However, using GC-DCIs to signal the UE groups may result in poor reliability when a quantity of UEs in a group is greater than a threshold quantity of UEs. Moreover, when the quantity of UEs in a group is less than the threshold quantity of UEs but a quantity of UE groups is greater than a threshold quantity of groups, an amount of PDCCH overhead associated with the GC-DCIs may still be excessive.

Some aspects described herein enable a UE to identify a plurality of SPS configurations associated with a plurality of SPS occasions and attempt to receive a PDSCH using one or more of the plurality of SPS occasions. In this way, the UE obviates a need for a BS to signal a change to an SPS configuration. Rather, the BS may change which SPS occasion the BS is to use to transmit the PDSCH, and the UE may sequentially attempt to receive the PDSCH in each of the plurality of SPS occasions. In this way, the UE reduces a signaling overhead associated with switching SPS configurations using PDCCH signaling, GC-DCI signaling, and/or the like.

Figure 7:
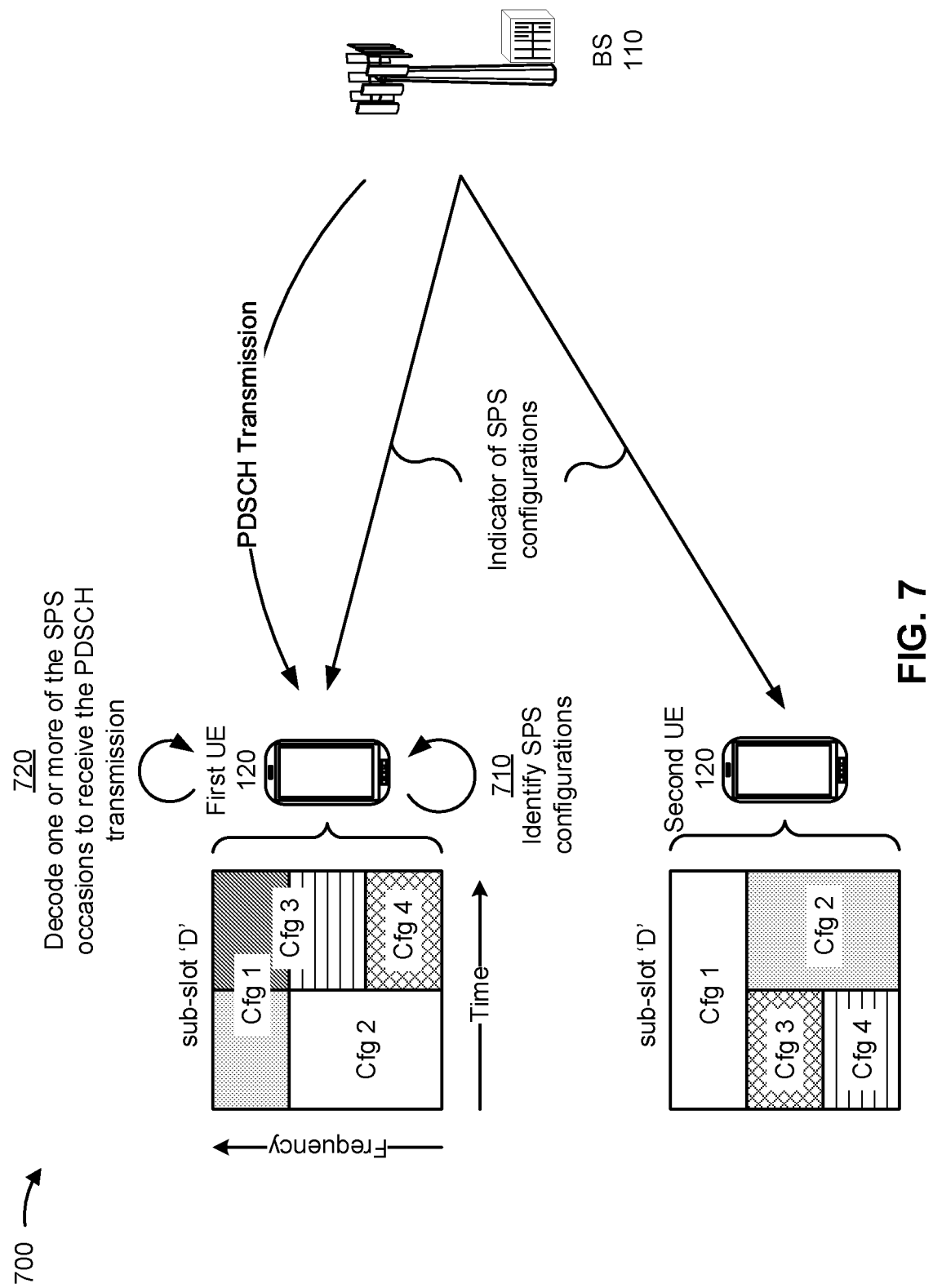
FIG. 7 is a diagram illustrating an example of decoding of semi-persistent scheduling occasions, in accordance with various aspects of the present disclosure.

FIG. 7 is a diagram illustrating an example 700 of decoding SPS scheduling occasions, in accordance with various aspects of the present disclosure. As shown in FIG. 7, example 700 includes a BS 110 and a set of UEs 120 (e.g., a first UE 120 and a second UE 120).

As further shown in FIG. 7, and by reference number 710, first UE 120 may identify a plurality of SPS configurations. For example, first UE 120 may determine a plurality of SPS occasions within a slot or a sub-slot. In this case, as shown, first UE 120 may identify a set of 4 SPS configurations corresponding to a set of SPS occasions within a particular sub-slot (sub-slot 'D'). In contrast, as shown, second UE 120 may identify a different set of 4 SPS configurations corresponding to a different set of SPS occasions.

In some aspects, first UE 120 may identify two or more SPS configurations that overlap with respect to time. For example, as shown, first UE 120 may identify a first SPS occasion of SPS configuration 1 (Cfg 1) that overlaps with a second SPS occasion of SPS configuration 3 (Cfg 3). In some aspects, first UE 120 may receive signaling identifying the plurality of SPS occasions. For example, first UE 120 may receive signaling identifying the plurality of SPS occasions from BS 110, but may not receive signaling indicating which SPS occasion BS 110 is to use for transmission of a PDSCH.

As further shown in FIG. 7, and by reference number 720, first UE 120 may decode one or more SPS occasions to attempt to receive a PDSCH transmission. For example, BS 110 may transmit the PDSCH transmission in an SPS occasion of the plurality of SPS occasions, and first UE 120 may attempt to decode one or more SPS occasions, sequentially, to receive the PDSCH transmission. In some aspects, first UE 120 may buffer a plurality of in-phase and quadrature (IQ) symbols before decoding the SPS occasions. For example, first UE 120 may buffer all IQ symbols within a bandwidth part that includes the slot or sub-slot (e.g., sub-slot D), and may decode SPS occasions within the slot or sub-slot based at least in part on buffering all of the IQ symbols. In some aspects, UE 120 may forgo monitoring of a control channel (e.g., a physical downlink control channel (PDCCH)) in one or more slots during which UE 120 is performing sequential decoding.

In some aspects, first UE 120 may decode a first SPS occasion and determine whether the first SPS occasion includes data of the PDSCH transmission. For example, first UE 120 may decode the first SPS occasion to attempt to receive the PDSCH transmission in the first SPS occasion. In some aspects, first UE 120 may decode each SPS occasion of the plurality of SPS occasions. For example, in this case, when first UE 120 detects data of the PDSCH transmission when decoding the first SPS occasion, first UE 120 may continue to decode a second SPS occasion, a third SPS occasion, and/or the like that are configured for first UE 120 after decoding the first SPS occasion.

Additionally, or alternatively, first UE 120 may decode SPS occasions until first UE 120 detects data of the PDSCH transmission. For example, first UE 120 may stop decoding SPS occasions based at least in part on determining that the first SPS occasion includes the PDSCH. In contrast, when first UE 120 determines that the first SPS occasion does not include the PDSCH, first UE 120 may decode a second PDSCH occasion, a third PDSCH occasion, and/or the like to attempt to receive the PDSCH. In this way, first UE 120 obviates a need for BS 110 to transmit an SPS reactivation when BS 110 is to switch SPS configurations for PDSCH transmission.

In some aspects, first UE 120 may transmit hybrid automatic repeat request (HARQ) feedback (e.g., a HARQ acknowledgement (ACK) or a HARQ negative acknowledgement (NACK)) based at least in part on attempting to receive the PDSCH. For example, when the plurality of SPS configurations have the same periodicity or when first UE 120 is to receive a single transport block in the slot or sub-slot, first UE 120 may be configured with a single physical uplink control channel (PUCCH) resource. In this case, first UE 120 may transmit HARQ feedback reporting for the slot or sub-slot (e.g., for each of the plurality of SPS configurations) using the single PUCCH resource.

Additionally, or alternatively, when the plurality of SPS configurations have a plurality of different periodicities or first UE 120 is to receive a plurality of transport blocks in the slot or sub-slot, first UE 120 may be configured with a plurality of PUCCH resources. In this case, first UE 120 may be configured with a plurality of PUCCH resources corresponding to the plurality of SPS configurations, and may provide HARQ feedback for decoding each SPS occasion, corresponding to each SPS configuration, using the plurality of PUCCH resources.

In some aspects, first UE 120 may transmit the HARQ feedback in accordance with a particular timeline. For example, an amount of time to report a HARQ ACK message may be based at least in part on a UE capability, a maximum quantity of SPS occasions within the plurality of SPS occasions, a quantity of symbols between an end of reception of the PDSCH and a beginning of a PUCCH for HARQ ACK reporting, and/or the like.

In some aspects, two or more of the plurality of SPS occasions may have a common HARQ identifier corresponding to a common HARQ feedback message. In this case, first UE 120 may report a HARQ feedback message for all SPS occasions of the slot or sub-slot that have the common HARQ identifier. Additionally, or alternatively, first UE 120 may report a HARQ feedback message for each non-overlapping SPS occasion in the slot or sub-slot that has the common HARQ identifier. In some aspects, two or more of the plurality of SPS occasions may have different HARQ identifiers, and first UE 120 may report a plurality of HARQ feedback messages for the plurality of SPS occasions with different HARQ identifiers.

In some aspects, first UE 120 may communicate in accordance with one or more communication constraints. For example, B S 110 may not transmit, and first UE 120 may not receive, a dynamic grant with the same HARQ identifier as a previous SPS occasion (e.g., which may indicate a retransmission of a PDSCH) before first UE 120 reports HARQ feedback for the previous SPS occasion. In some aspects, first UE 120 may alter an SPS occasion based at least in part on receiving a dynamic grant (e.g., after first UE 120 reports HARQ feedback). For example, first UE 120 may receive a dynamic grant with a particular HARQ identifier that indicates a new transport block transmission with the particular HARQ identifier, and first UE 120 may overwrite an SPS occasion corresponding to the HARQ identifier. Additionally, or alternatively, first UE 120 may stop processing one or more other SPS occasions within the slot or sub-slot based at least in part on receiving the dynamic grant.

As indicated above, FIG. 7 is provided as an example. Other examples may differ from what is described with respect to FIG. 7.

Figure 8:
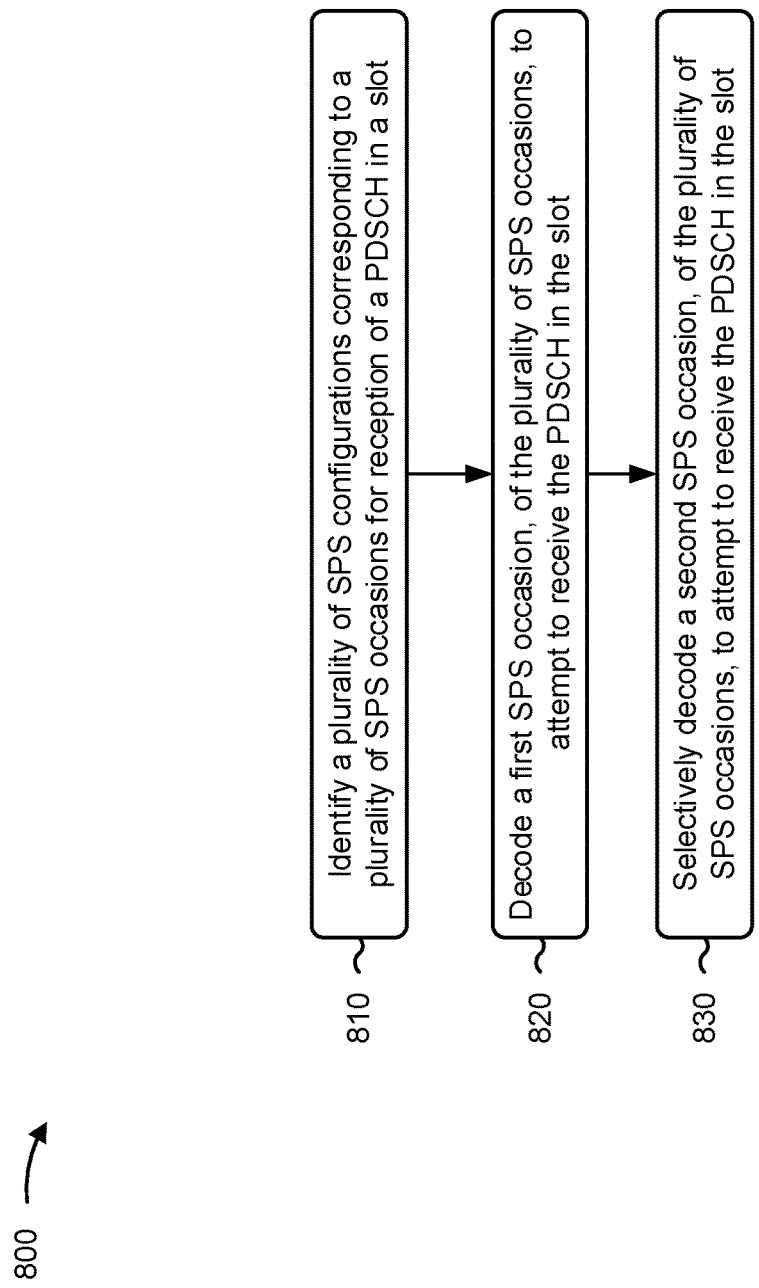
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with decoding of SPS occasions.

As shown in FIG. 8, in some aspects, process 800 may include identifying a plurality of SPS configurations corresponding to a plurality of SPS occasions for reception of a PDSCH in a slot (block 810). For example, the UE (e.g., using controller/processor 280 and/or the like) may identify a plurality of SPS configurations corresponding to a plurality of SPS occasions for reception of a PDSCH in a slot, as described above.

As further shown in FIG. 8, in some aspects, process 800 may include decoding a first SPS occasion, of the plurality of SPS occasions, to attempt to receive the PDSCH in the slot (block 820). For example, the UE (e.g., using antenna 252, DEMOD 254, MIMO detector 256, receive processor 258, controller/processor 280, and/or the like) may decode a first SPS occasion, of the plurality of SPS occasions, to attempt to receive the PDSCH in the slot, as described above.

As further shown in FIG. 8, in some aspects, process 800 may include selectively decoding a second SPS occasion, of the plurality of SPS occasions, to attempt to receive the PDSCH in the slot (block 830). For example, the UE (e.g., using antenna 252, DEMOD 254, MIMO detector 256, receive processor 258, controller/processor 280, and/or the like) may selectively decode a second SPS occasion, of the plurality of SPS occasions, to attempt to receive the PDSCH in the slot, as described above.

Process 800 may include additional aspects, such as any single aspect or any combination of aspects described below and/or in connection with one or more other processes described elsewhere herein.

In a first aspect, a first SPS configuration, of the plurality of SPS configurations, overlaps in time with a second SPS configuration of the plurality of SPS configurations.

In a second aspect, alone or in combination with the first aspect, identifying the plurality of SPS configurations includes identifying the plurality of SPS configurations based at least in part on received signaling or stored configuration information.

In a third aspect, alone or in combination with one or more of the first and second aspects, identifying the plurality of SPS configurations includes buffering IQ symbols within a bandwidth part of the slot; and decoding each SPS configuration and each associated SPS occasion sequentially.

In a fourth aspect, alone or in combination with one or more of the first through third aspects, the UE is configured to decode each SPS occasion, of the plurality of SPS occasions, to attempt to receive the PDSCH in the slot.

In a fifth aspect, alone or in combination with one or more of the first through fourth aspects, the UE is configured to decode the second SPS occasion based at least in part on not detecting data associated with the first SPS occasion.

In a sixth aspect, alone or in combination with one or more of the first through fifth aspects, the UE is configured to not decode the second SPS occasion based at least in part on detecting data associated with the first SPS occasion.

In a seventh aspect, alone or in combination with one or more of the first through sixth aspects, process 800 includes performing hybrid automatic repeat request feedback reporting using a single physical uplink control channel resource associated with the plurality of SPS configurations and the plurality of SPS occasions in the slot.

In an eighth aspect, alone or in combination with one or more of the first through seventh aspects, process 800 includes performing hybrid automatic repeat request feedback reporting using a PUCCH resource of a plurality of PUCCH resources corresponding to the plurality of SPS configurations and the plurality of SPS occasions in the slot.

In a ninth aspect, alone or in combination with one or more of the first through eighth aspects, a time for reporting HARQ feedback as a response to the PDSCH is based at least in part on at least one of a UE capability, a quantity of SPS occasions in the plurality of SPS occasions, or a quantity of symbols between an end of PDSCH reception and a beginning of an allocation for the HARQ feedback reporting.

In a tenth aspect, alone or in combination with one or more of the first through ninth aspects, two or more of the plurality of SPS occasions are associated with a common hybrid automatic repeat request identifier.

In an eleventh aspect, alone or in combination with one or more of the first through tenth aspects, two or more of the plurality of SPS occasions are associated with two or more different HARQ identifiers.

In a twelfth aspect, alone or in combination with one or more of the first through eleventh aspects, process 800 includes reporting HARQ feedback for each SPS occasion, of the plurality of SPS occasions, of the slot.

In a thirteenth aspect, alone or in combination with one or more of the first through twelfth aspects, process 800 includes reporting HARQ feedback for each non-overlapping SPS occasion, of the plurality of SPS occasions, of the slot.

In a fourteenth aspect, alone or in combination with one or more of the first through thirteenth aspects, process 800 includes receiving a dynamic grant with a HARQ identifier corresponding to a HARQ identifier used in the slot after reporting HARQ feedback.

In a fifteenth aspect, alone or in combination with one or more of the first through fourteenth aspects, process 800 includes receiving a dynamic grant indicating a transport block transmission with a same HARQ identifier as is used in the slot, and overwriting an SPS occasion corresponding to the HARQ identifier based at least in part on the dynamic grant.

In a sixteenth aspect, alone or in combination with one or more of the first through fifteenth aspects, process 800 includes receiving a dynamic grant indicating a transport block transmission with a same HARQ identifier as is used in the slot, and stopping processing of SPS occasions within the slot based at least in part on the dynamic grant.

In a seventeenth aspect, alone or in combination with one or more of the first through sixteenth aspects, the UE is configured to forgo monitoring of a control channel in one or more slots during which the UE is decoding each SPS configuration sequentially.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving signaling identifying a plurality of semi-persistent scheduling (SPS) configurations corresponding to a plurality of SPS occasions for reception of a physical downlink shared channel (PDSCH) in a slot,
      wherein the signaling does not indicate which SPS configuration, of the plurality of SPS configurations, is to be used for reception of the PDSCH;
   buffering in-phase and quadrature (IQ) symbols associated with a bandwidth part of the slot and
   decoding, based at least in part on buffering the IQ symbols, a subset of SPS configurations, of the plurality of SPS configurations, and a subset of SPS occasions, of the plurality of SPS occasions, sequentially, to attempt to receive the PDSCH in the slot.

2. The method of claim 1, wherein a first SPS configuration, of the plurality of SPS configurations, overlaps in time with a second SPS configuration of the plurality of SPS configurations.

3. The method of claim 1, further comprising:
   identifying the plurality of SPS configurations based at least in part on receiving the signaling.

4. The method of claim 1, wherein buffering the IQ symbols comprises:
   buffering the IQ symbols within the bandwidth part of the slot.

5. The method of claim 1, further comprising:
   foregoing monitoring of a control channel in one or more slots during which the UE is decoding each SPS occasion and each SPS configuration sequentially.

6. The method of claim 1, wherein decoding the subset of SPS configurations and the subset of SPS occasions comprises:
   decoding each SPS configuration, of the plurality of SPS configurations, and each SPS occasion, of the plurality of SPS occasions, sequentially, to attempt to receive the PDSCH in the slot.

7. The method of claim 1, wherein decoding the subset of SPS occasions, sequentially, comprises:
   decoding a subsequent SPS occasion, of the subset of SPS occasions, based at least in part on not detecting data associated with a previous SPS occasions of the plurality of SPS occasions.

8. The method of claim 1, wherein decoding the subset of SPS SPS occasions, sequentially, comprises:
   foregoing decoding a subsequent SPS occasion, of the plurality of SPS occasions, based at least in part on detecting data associated with a previous SPS occasion of the subset of SPS occasions.

9. The method of claim 1, further comprising:
   performing hybrid automatic repeat request feedback reporting using a single physical uplink control channel resource associated with the plurality of SPS configurations and the plurality of SPS occasions in the slot.

10. The method of claim 1, further comprising:
    performing hybrid automatic repeat request feedback reporting using a physical uplink control channel (PUCCH) resource of a plurality of PUCCH resources corresponding to the plurality of SPS configurations and the plurality of SPS occasions in the slot.

11. The method of claim 1, wherein a time for reporting hybrid automatic repeat request (HARD) feedback as a response to the PDSCH is based at least in part on at least one of: a UE capability, a quantity of SPS occasions in the plurality of SPS occasions, or a quantity of symbols between an end of PDSCH reception and a beginning of an allocation for the HARQ feedback reporting.

12. The method of claim 1, wherein two or more of the plurality of SPS occasions are associated with a common hybrid automatic repeat request identifier.

13. The method of claim 1, wherein two or more of the plurality of SPS occasions are associated with two or more different hybrid automatic repeat request (HARQ) identifiers.

14. The method of claim 13, further comprising:
    reporting HARQ feedback for each SPS occasion, of the plurality of SPS occasions, of the slot.

15. The method of claim 13, further comprising:
    reporting HARQ feedback for each non-overlapping SPS occasion, of the plurality of SPS occasions, of the slot.

16. The method of claim 1, further comprising:
    receiving a dynamic grant with a hybrid automatic repeat request (HARQ) identifier corresponding to a HARQ identifier used in the slot after reporting HARQ feedback.

17. The method of claim 1, further comprising:
    receiving a dynamic grant indicating a transport block transmission with a same hybrid automatic repeat request (HARQ) identifier as is used in the slot, and
    overwriting an SPS occasion corresponding to the HARQ identifier based at least in part on the dynamic grant.

18. The method of claim 1, further comprising:
    receiving a dynamic grant indicating a transport block transmission with a same hybrid automatic repeat request (HARQ) identifier as is used in the slot, and
    stopping processing of SPS occasions within the slot based at least in part on the dynamic grant.

19. A user equipment (UE) for wireless communication, comprising:
    a memory; and
    one or more processors coupled to the memory, the one or more processors configured to:
       receive signaling identifying a plurality of semi-persistent scheduling (SPS) configurations corresponding to a plurality of SPS occasions for reception of a physical downlink shared channel (PDSCH) in a slot,
          wherein the signaling does not indicate which SPS configuration, of the plurality of SPS configurations, is to be used for reception of the PDSCH;
       buffer in-phase and quadrature (IQ) symbols associated with a bandwidth part of the slot and decode, based at least in part on buffering the IQ symbols, a subset of SPS configurations, of the plurality of SPS configurations, and a subset of SPS occassions, of the plurality of SPS occasions, sequentially, to attempt to receive the PDSCH in the slot.

20. The UE of claim 19, wherein a first SPS configuration, of the plurality of SPS configurations, overlaps in time with a second SPS configuration of the plurality of SPS configurations.

21. The UE of claim 19, wherein the one or more processors are configured to:
identify the plurality of SPS configurations based at least in part on receiving the signaling.

22. The UE of claim 19, wherein, to identify the IQ symbols, the one or more processors are configured to:
buffer the IQ symbols within the bandwidth part of the slot.

23. A non-transitory computer-readable medium storing a set of instructions for wireless communication, the set of instructions comprising:
one or more instructions that, when executed by one or more processors of a user equipment (UE), cause the UE to:
receive signaling identifying a plurality of semi-persistent scheduling (SPS) configurations corresponding to a plurality of SPS occasions for reception of a physical downlink shared channel (PDSCH) in a slot,
wherein the signaling does not indicate which SPS configuration, of the plurality of SPS configurations, is to be used for reception of the PDSCH;
buffer in-phase and quadrature (IQ) symbols associated with a bandwidth part of the slot and
decode, based at least in part on buffering the IQ symbols, a subset of SPS configurations, of the plurality of SPS configurations, and a subset of SPS occassions, of the plurality of SPS occasions, sequentially, to attempt to receive the PDSCH in the slot.

24. The non-transitory computer-readable medium of claim 23, wherein a first SPS configuration, of the plurality of SPS configurations, overlaps in time with a second SPS configuration of the plurality of SPS configurations.

25. The non-transitory computer-readable medium of claim 23, wherein the one or more instructions, when executed by the one or more processors of the UE, cause the UE to:
identify the plurality of SPS configurations based at least in part on receiving the signaling.

26. The non-transitory computer-readable medium of claim 23, wherein one or more instructions, that cause the UE to identify the IQ symbols, cause the UE to:
buffer the IQ symbols within the bandwidth part of the slot.

27. An apparatus for wireless communication, comprising:
means for receiving signaling identifying a plurality of semi-persistent scheduling (SPS) configurations corresponding to a plurality of SPS occasions for reception of a physical downlink shared channel (PDSCH) in a slot,
wherein the signaling does not indicate which SPS configuration, of the plurality of SPS configurations, is to be used for reception of the PDSCH;
means for buffering in-phase and quadrature (IQ) symbols associated with a bandwidth part of the slot and
means for decoding, based at least in part on buffering the IQ symbols, a subset of SPS configurations, of the plurality of SPS configurations, and a subset of SPS occasions, of the plurality of SPS occasions, sequentially, to attempt to receive the PDSCH in the slot.

28. The apparatus of claim 27, wherein a first SPS configuration, of the plurality of SPS configurations, overlaps in time with a second SPS configuration of the plurality of SPS configurations.

29. The apparatus of claim 27, further comprising:
means for identifying the plurality of SPS configurations based at least in part on receiving the signaling.

30. The apparatus of claim 27, wherein the means for buffering the IQ symbols comprises:
means for buffering the IQ symbols within the bandwidth part of the slot.

* * * * *